(12) United States Patent
Ferris

(10) Patent No.: US 10,025,627 B2
(45) Date of Patent: Jul. 17, 2018

(54) ON-DEMAND CLOUD COMPUTING ENVIRONMENTS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1891 days.

(21) Appl. No.: 12/324,437

(22) Filed: Nov. 26, 2008

(65) Prior Publication Data
US 2010/0131948 A1 May 27, 2010

(51) Int. Cl.
G06F 9/46 (2006.01)
G06F 9/50 (2006.01)

(52) U.S. Cl.
CPC .................................. G06F 9/50 (2013.01)

(58) Field of Classification Search
CPC .. G06F 9/44505; G06F 11/3442; G06F 9/455; G06F 9/50; G06F 9/5005; G06F 9/5061; G06F 9/5072; G06F 9/5077; G06F 2009/45562; G06F 21/31
See application file for complete search history.

(56) References Cited

U.S. PATENT DOCUMENTS

| | | | |
|---|---|---|---|
| 6,463,457 B1 | 10/2002 | Armentrout et al. | |
| 6,990,666 B2 * | 1/2006 | Hirschfeld et al. | 718/104 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,533,385 B1 * | 5/2009 | Barnes | 718/104 |
| 7,546,462 B2 | 6/2009 | Upton | |
| 7,577,722 B1 * | 8/2009 | Khandekar et al. | 709/220 |
| 7,596,620 B1 | 9/2009 | Colton et al. | |
| 7,712,100 B2 * | 5/2010 | Fellenstein et al. | 718/104 |
| 7,836,452 B2 * | 11/2010 | Taylor | 718/104 |
| 7,912,955 B1 * | 3/2011 | Machiraju et al. | 709/226 |
| 8,464,250 B1 * | 6/2013 | Ansel | 718/1 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0155033 A1 * | 7/2005 | Luoffo et al. | 718/104 |

(Continued)

OTHER PUBLICATIONS

Chase et al. ("Dynamic virtual clusters in a grid site manager", 2003, Department of Science—Duke University, pp. 1-10 pages).*

(Continued)

*Primary Examiner* — James J Lee
(74) *Attorney, Agent, or Firm* — Lowenstein Sandler LLP

(57) ABSTRACT

A cloud management system can be configured to provide a cloud computing environment in response to a request for an execution platform. The cloud management system can be configured to determine a set of resources from non-dedicated cloud controlled resources or third-party resources that meet specifications of the requested execution platform. The cloud management system can be configured to create the on-demand cloud from the determined set of resources to serve as the execution platform.

13 Claims, 5 Drawing Sheets

(56) References Cited

U.S. PATENT DOCUMENTS

| | | |
|---|---|---|
| 2005/0182727 A1 | 8/2005 | Robert et al. |
| 2005/0289540 A1 | 12/2005 | Nguyen et al. |
| 2006/0059492 A1* | 3/2006 | Fellenstein et al. .......... 718/104 |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0149842 A1* | 7/2006 | Dawson et al. .............. 709/226 |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0271560 A1* | 11/2007 | Wahlert et al. .................... 718/1 |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2008/0244579 A1* | 10/2008 | Muller .......................... 718/100 |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0125902 A1* | 5/2009 | Ghosh ................. G06F 9/45533 718/1 |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0271498 A1* | 10/2009 | Cable ............................ 709/219 |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1* | 2/2010 | Stienhans et al. ............ 709/226 |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spaltro et al. |

OTHER PUBLICATIONS

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud installation Information Using Cloud-Aware Kernel of Operating System" U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System installation in Cloud-Based Network", U.S. Appl. No. 13/149,877, filed May 31, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al, "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

(56) References Cited

OTHER PUBLICATIONS

Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.
Ferris, et al., "Systems and Methods for Cominatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Capture and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods," U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

ON-DEMAND CLOUD COMPUTING ENVIRONMENTS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, in the cloud computing environment, the resources, provided by the cloud, come from dedicated servers and other computers. Typically, the provider or originator of the cloud maintains dedicated servers in order to provide resources for the cloud. Additionally, in specific application based computing environments, individual users may be able to add their particular computing resources to the computing environment. For example, the Search for Extraterrestrial Intelligence (SETI) program allows individual users to contribute the processing power of their personal systems for performing mathematical computations on experimental data.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for providing a cloud computing environment on-demand. More particularly, embodiments relate to platforms and techniques in which a cloud computing environment can be created, on-demand, from non-dedicated cloud controlled resources or third-party resources.

According to embodiments, a cloud management system can be configured to receive requests to provide an execution platform for applications, virtual machines, appliances, etc. The cloud management system can be configured to create a cloud, on-demand, to meet the request. The cloud management system can be configured to determine a set of resources from non-dedicated cloud controlled resources or third-party resources that meet specifications of the requested execution platform. The cloud management system can be configured to create the on-demand cloud from the determined set of resources to serve as the execution platform. After creation, the cloud management system can be configured to instantiate the requested applications, virtual machines, appliances, etc. in the on-demand cloud. Additionally, the cloud management system can be configured to destroy the cloud once the computing platform is no longer needed.

By allowing a cloud to be created on-demand, a cloud computing environment can be created that does not require dedicated resources to support the cloud. Additionally, by utilizing non-dedicated and third party resources on-demand, the cloud computing environment can leverage additional resources without requiring the resources to be tied-down for unspecified periods of time. As such, clouds can be flexibly created to meet the individual demands of cloud users without wasting resources.

Figure 1:
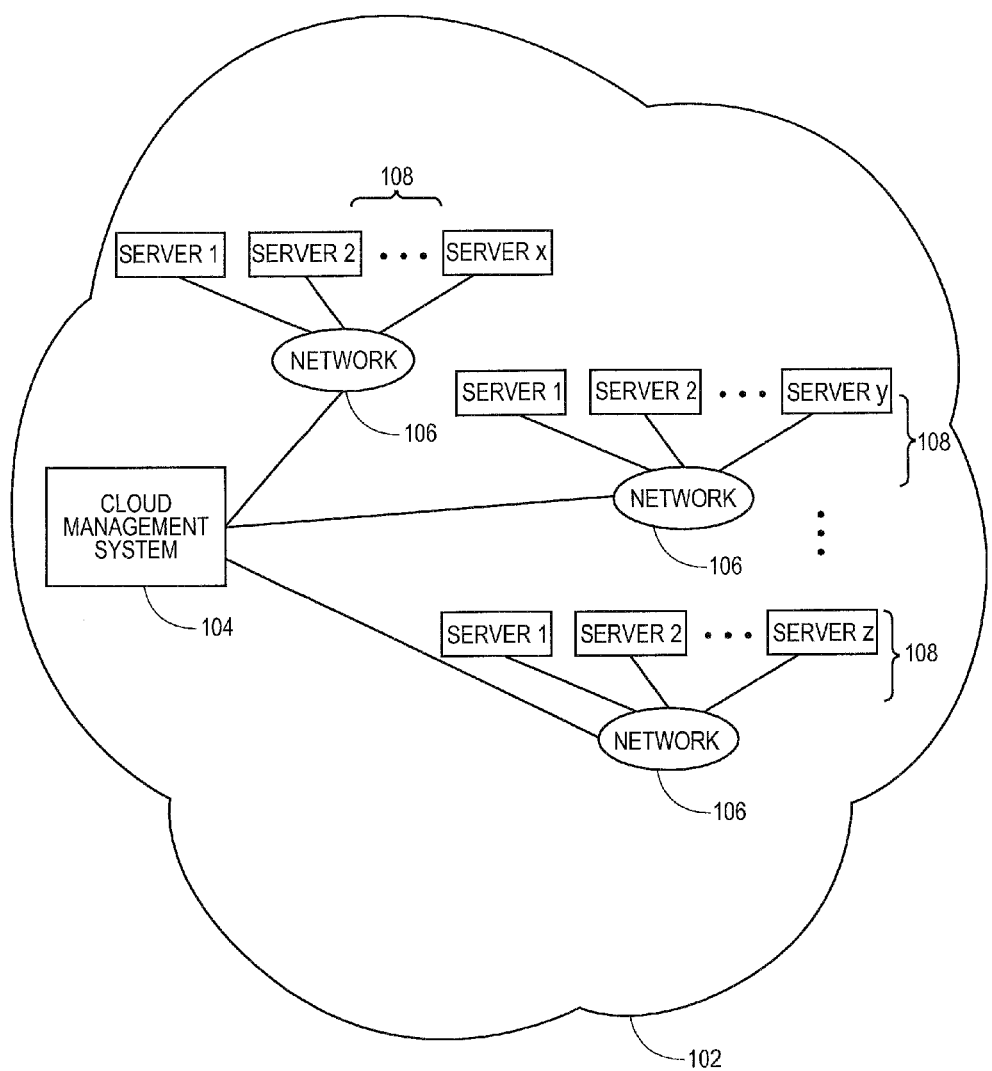
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
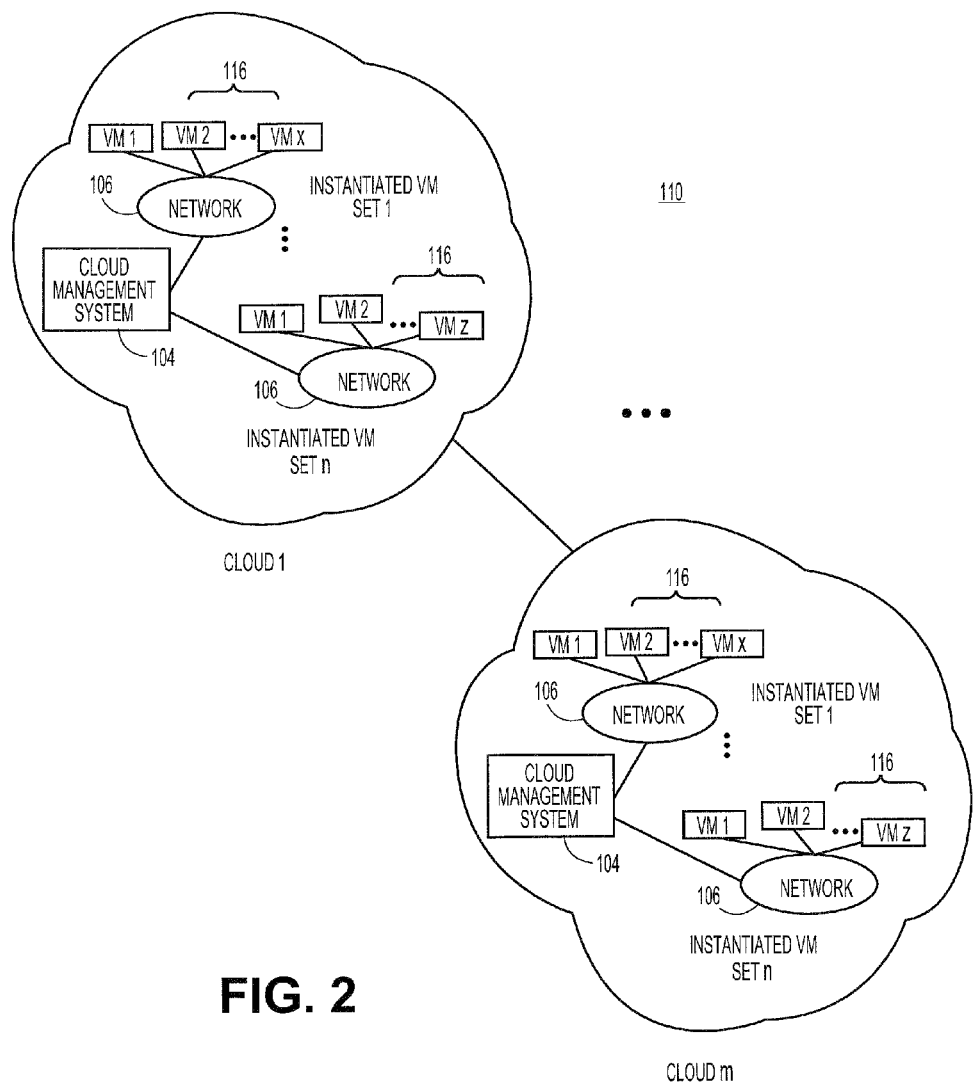
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
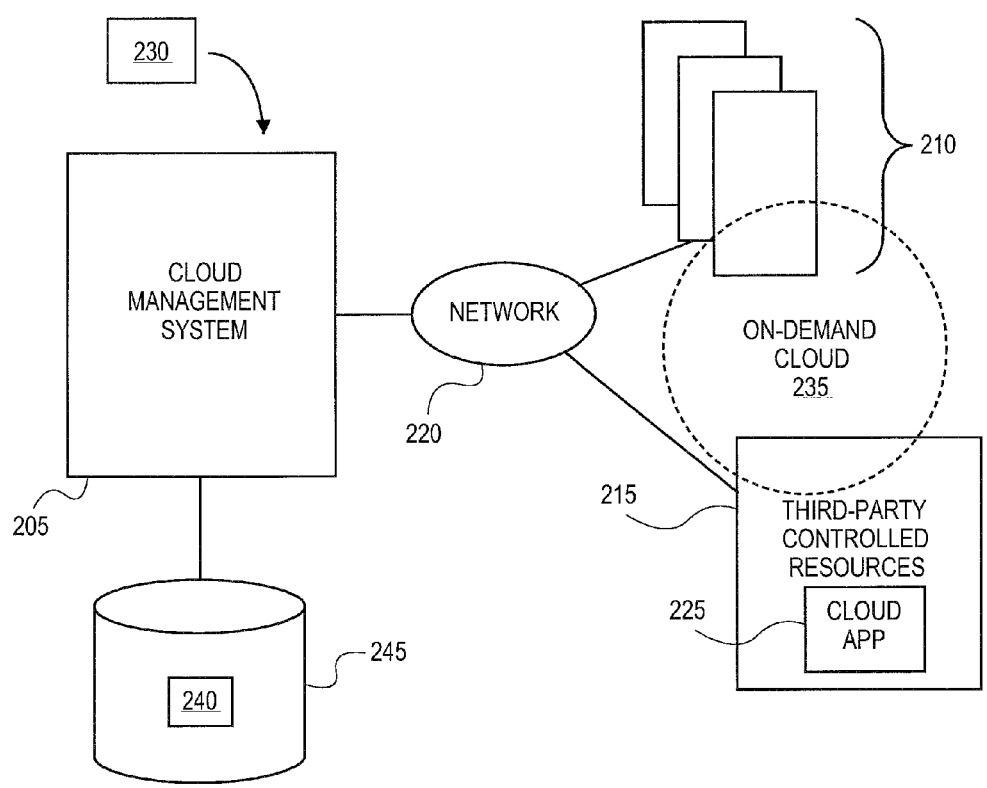
FIG. 3 illustrates an overall system architecture in which a cloud computing environment can be created on-demand, according to various embodiments.

FIG. 3 illustrates aspects of of a cloud computing environment in which cloud computing environments can be created on-demand, according to various embodiments. In embodiments, a cloud management system 205 can be configured to provide on-demand clouds without maintaining static and dedicated cloud resources.

In embodiments, the cloud management system 205 can be configured to communicate with non-dedicated resources 210 and third-party controlled resources 215 via a network 220. Network 220 can include one or more networks, such as the Internet or other public or private networks. The non-dedicated resources 210 can be any type of computer systems under the control of an owner or operator of the cloud management system 205. For example, the non-dedicated resources 210 can be one or more personal computers (desktop, laptop, etc.), one or more server computers, and the like. The non-dedicated resources 210 can include hardware resources, such as processors, memory, network hardware and bandwidth, storage devices, and the like, and software resources, such as operating systems (OS), application programs, and the like.

In embodiments, the third-party controlled resources 215 can be any type of computer systems under the control of a user, independent of the owner or operator of the cloud 102. For example, the third-party controlled resources 215 can be one or more personal computers (desktop, laptop, etc.), one or more server computers, and the like, which are under the control of individuals, companies, and the like. The third-party controlled resources 215 can include hardware resources, such as processors, memory, network hardware and bandwidth, storage devices, and the like, and software resources, such as operating systems (OS), application programs, and the like. The user of the third-party controlled resources 215 can desire to make the third-party controlled resources 215 available to the cloud management system 205. As such, the cloud management system 205 can utilize the third-party controlled resources 215 in the pool of resources for the on-demand clouds.

In embodiments, to make the resources available, the third-party controlled resources 215 can include a cloud application 225. The cloud application 225 can be configured to allow the user to make a set of the resources of the third-party controlled resources 215 available to the cloud management system 205. The cloud application 225 can be configured to allow the cloud management system 205 to request resources from the set of resources. In response to requests, the cloud application 225 can be configured to provide access to the set of resources for use by the cloud management system 205.

In embodiments, the cloud application 225 can be configured to contain necessary logic for identifying and providing accesses to a set of resources of the third-party controlled resources 215 and for communicating with the cloud management system 205. For example, the cloud application 225 can be configured to contain logic for communicating with the hardware resources of the third-party controlled resources 215 (e.g. processor, memory, storage devices, network interfaces, etc.) and software resources of the third-party controlled resources 215 (operating systems, application programs, etc.). For example, the cloud application 225 can be configured to communicate with the OS to identify and allocate resources accessible by the cloud management system 205. Additionally, the cloud application 225 can be configured to allow the user to specify a particular set of resources accessible by the cloud management system 205.

In embodiments, the cloud application 225 can be configured to grant access to the set of resources. For example, the cloud application 225 can be configured to communicate with the hardware and software resources to grant direct access to the set of resources to the cloud management system 205 for instance, via TCP/IP, FTP or other protocols or channels. Likewise, the cloud application 225 can be configured to receive the processes to be performed on the third-party controlled resources 215 and to instantiate the processes on the set of resources.

In embodiments, the cloud application 225 can be configured to provide secure communications between the cloud application 225 and the cloud management system 205. The cloud application 225 can be configured to include the necessary logic to perform any known security protocols between the third-party controlled resources 215 and the cloud management system 205. For example, the cloud application 225 can be configured to perform authentication (secure login, passwords checks, digital signatures authentication, digital certificate authentication, etc), communication encryption (symmetric cryptography, asymmetric cryptography, etc.), and the like.

In embodiments, the non-dedicated resources 210 can include a cloud application 225 as described above. Likewise, the cloud management system 205 can be configured to contain logic to directly access, control, and allocate the hardware and software resources of the non-dedicated resources 210.

In embodiments, the cloud management system 205 can be configured to receive a request 230 to provide an on-demand cloud for supporting a computing process. The computing process can include applications, appliances, virtual machines, and the like. The request 230 can also include the specifications of the computing process. For example, the request 230 can include information identifying the desired resources for the computing process (processing power, memory, network bandwidth, etc.), the time period for the computing process (start time, end time, duration), and the like. The request 230 can be initiated by the operator or owner of the cloud management system 205. Likewise, the cloud management system 205 can be configured to receive the request 230 from a separate entity.

In embodiments, the cloud management system 205 can be configured to create an on-demand cloud 235 to support the requested computing process. The cloud management system 205 can be configured to identify a set of resources from the non-dedicated resources 210 and third-party controlled resources 215 that matches the specifications of the computing process. To identify the set of resources, the cloud management system 205 can be configured to directly query the non-dedicated resources 210 and third-party controlled resources 215 to determine the available resources.

In embodiments, additionally, the cloud management system 205 can be configured to maintain a record 240 that identifies the available resources of the non-dedicated resources 210 and third-party controlled resources 215. The record 240 can be configured as any type of data structure capable of storing information about the available resources. For example, the record 240 can include information such as identity of non-dedicated resources 210 and third-party controlled resources 215, available resources (hardware and software resources), availability of the resources (time periods, duration, etc.). The cloud management system 205 can be configured to maintain the record in a repository 245, such as a database.

In embodiments, once identified, the cloud management system 205 can be configured to create the on-demand cloud 235. To create the on-demand cloud 235, the cloud management system 205 can be configured to request allocation of the identified resources from the non-dedicated resources 210 and third-party controlled resources 215. If the cloud management system 205 has direct control of the resources, the cloud management system 205 can be configured to directly allocate the resources to the on-demand cloud 235.

Once created, the cloud management system 205 can be configured to instantiate the computing process in the on-demand cloud 235. Likewise, the cloud management system 205 can be configured to provide interfaces (APIs, communication channels, etc.) for the requester to access the on-demand cloud 235.

In embodiments, once the on-demand cloud 235 is no longer needed, the cloud management system 205 can be configured to destroy the on-demand cloud 235. For example, the cloud management system 205 can destroy the on-demand cloud 235 at the expiration of the duration of the on-demand cloud or at the direction of the requester of the computing process. To destroy the on-demand cloud 235, the cloud management system 205 can be configured to request de-allocation of the identified resources from the non-dedicated resources 210 and third-party controlled resources 215. If the cloud management system 205 has direct control of the resources, the cloud management system 205 can be configured to directly de-allocate the resources to the on-demand cloud 235.

Figure 4:
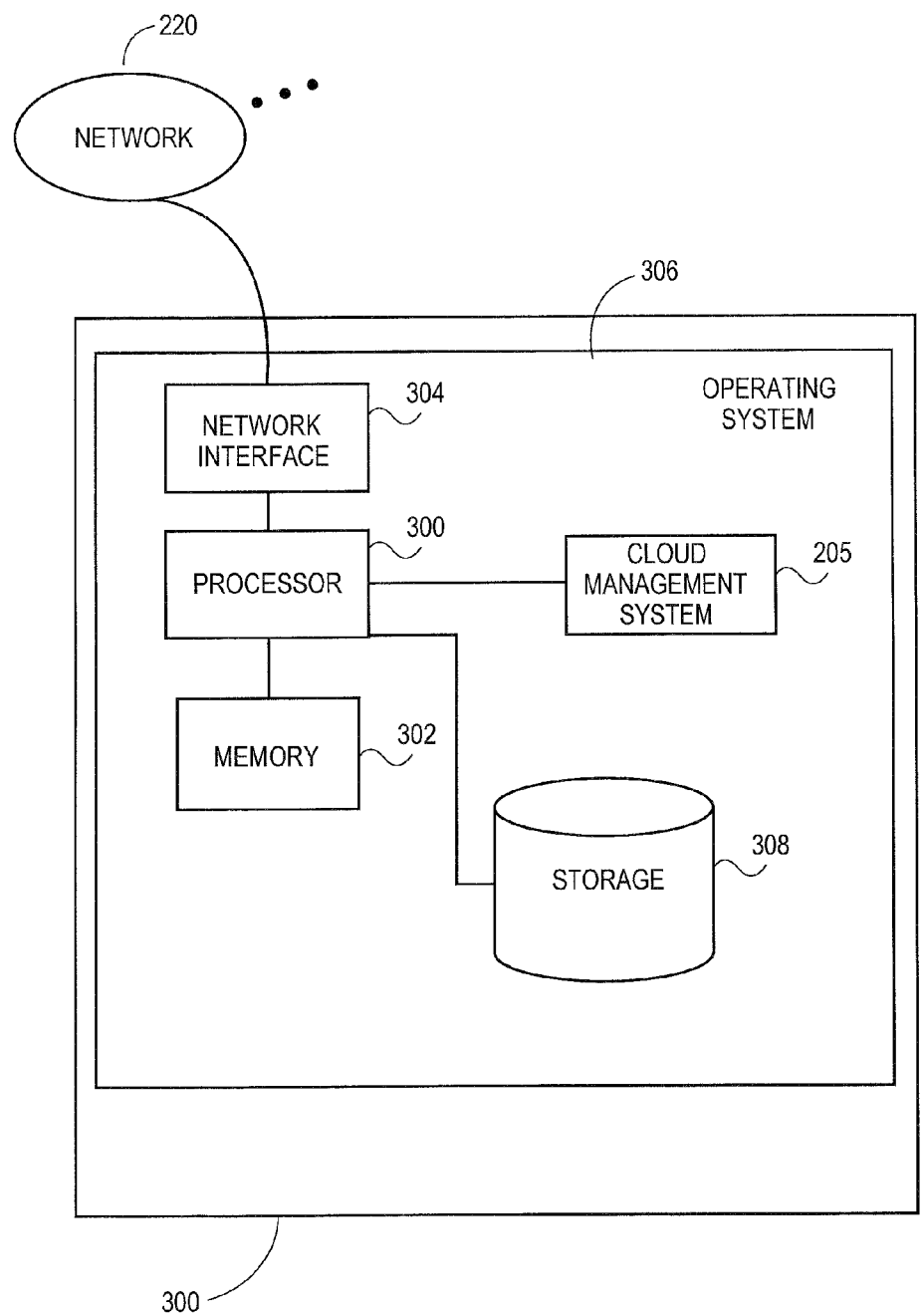
FIG. 4 illustrates an exemplary hardware configuration for supporting a cloud management system, according to various embodiments.

FIG. 4 illustrates an exemplary diagram of hardware and other resources that can be incorporated in a computing system 300 and configured to communicate with the non-dedicated resources 210 and third-party controlled resources 215 via one or more networks 220, according to embodiments. In embodiments as shown, the computing system 300 can comprise a processor 300 communicating with memory 302, such as electronic random access memory, operating under control of or in conjunction with operating system 306. Operating system 306 can be, for example, a distribution of the Linux™ operating system, such as SELinux, the Unix™ operating system, or other open-source or proprietary operating system or platform. Processor 300 also communicates with one or more storage device 308, such as hard drives, optical storage, and the like, for maintaining the repository 245 and the record 240. Processor 300 further communicates with network interface 304, such as an Ethernet or wireless data connection, which in turn communicates with one or more networks 220, such as the Internet or other public or private networks.

Processor 300 also communicates with the cloud management system 205, to execute control logic and allow creation of on-demand clouds as described above and below. Other configurations of the computing system 300, associated network connections, and other hardware and software resources are possible.

While FIG. 4 illustrates the computing system 300 as a standalone system including a combination of hardware and software, the computing system 300 can include multiple systems operating in cooperation. The cloud management system 205 can be implemented as a software application or program capable of being executed by the computing system 300, as illustrated, or other conventional computer platforms. Likewise, the cloud management system 205 can also be implemented as a software module or program module capable of being incorporated in other software applications and programs. In either case, the cloud management system 205 can be implemented in any type of conventional proprietary or open-source computer language.

Figure 5:
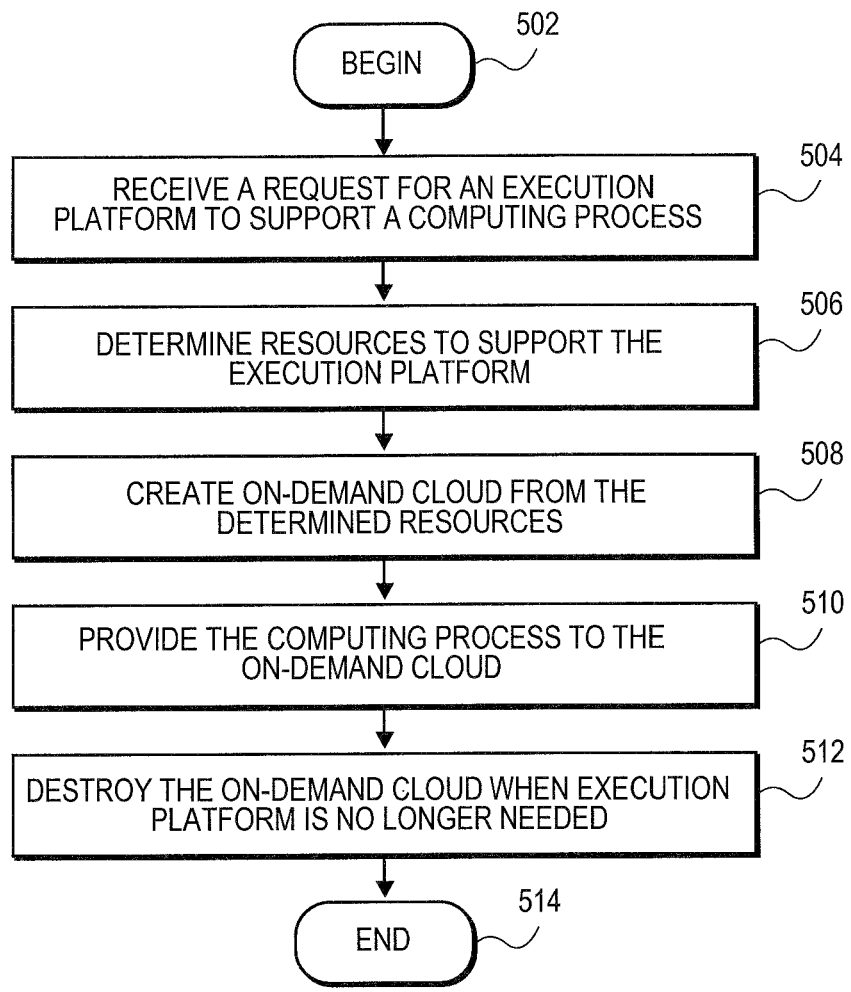
FIG. 5 illustrates a flowchart for providing an on-demand cloud computing environment, according to various embodiments.

FIG. 5 illustrates a flow diagram of providing on-demand clouds, according to embodiments. In 502, processing can begin. In 504, the cloud management system 205 receives a request 230 for an execution platform to support a computing process. The computing process can include applications, appliances, virtual machines, and the like. The request 230 can also include the specifications of the computing process. For example, the request 230 can include information identifying the desired resources for the computing process (processing power, memory, network bandwidth, etc.), the time period for the computing process (start time, end time, duration), and the like. The request 230 can be initiated by the operator or owner of the cloud management system 205. Likewise, the cloud management system 205 can receive the request 230 from a separate entity.

In 506, the cloud management system 205 determines resources to support the execution platform. The cloud management system 205 can identify a set of resources from the non-dedicated resources 210 and third-party controlled resources 215 that matches the specifications of the computing process. To identify the set of resources, the cloud management system 205 can directly query the non-dedicated resources 210 and third-party controlled resources 215 to determine the available resources. Likewise, the cloud management system 205 can maintain a record 240 that identifies the available resources of the non-dedicated resources 210 and third-party controlled resources 215.

In 508, the cloud management system 205 creates an on-demand cloud from the determined resources. To create the on-demand cloud 235, the cloud management system 205 can request allocation of the identified resources from the non-dedicated resources 210 and third-party controlled resources 215. If the cloud management system 205 has direct control of the resources, the cloud management system 205 can directly allocate the resources to the on-demand cloud 235.

In 510, the cloud management system 205 provides the computing process to the on-demand cloud. The cloud management system 205 can instantiate the computing process in the on-demand cloud 235. Likewise, the cloud management system 205 can provide interfaces (APIs, communication channels, etc.) for the requester to access the on-demand cloud 235.

In 512, the cloud management system 205 destroys the on-demand cloud when the execution platform is no longer needed. The cloud management system 205 can destroy the on-demand cloud at the expiration of the duration of the on-demand cloud or at the direction of the requester of the computing process. To destroy the on-demand cloud 235, the cloud management system 205 can request de-allocation of the identified resources from the non-dedicated resources 210 and third-party controlled resources 215. If the cloud management system 205 has direct control of the resources, the cloud management system 205 can directly de-allocate the resources to the on-demand cloud 235.

Then, in 514, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
receiving a request, from a requester device, to generate a first cloud to support a particular type of a virtual machine associated with an application platform to execute one or more applications of the virtual machine, wherein the request comprises one or more operating characteristics of the virtual machine and a time duration for which the first cloud is requested;
responsive to receiving the request, identifying, by a processor, a set of resources associated with a pool of available resources in view of the operating characteristics of the virtual machine, wherein the identified set of resources comprise at least one non-dedicated cloud controlled resources and at least one externally controlled resource, and wherein the identified set of resources comprises an operating system to support the operating characteristics of the virtual machine on the application platform;
generating, by the processor, the first cloud from the identified set of resources;
instantiating, by the processor, the virtual machine onto the application platform in the first cloud;
providing, by the processor, the requester device with access to the virtual machine; and
responsive to detecting an expiration of the time duration associated with the request, de-allocating by the processor, the identified set of resources associated with the first cloud.

2. The method of claim 1, further comprising maintaining a record of the identified set of resources.

3. The method of claim 1, wherein the request to generated the first cloud comprises a set of specifications and identifying a portion of the identified set of resources that satisfy the set of specification.

4. The method of claim 1, wherein de-allocating the identified set of resources comprises at least one of requesting de-allocation of the identified set of resources or directly de-allocating the identified set of resources.

5. A system comprising:
a memory; and
a processor, operatively coupled to the memory, to:
receive a request, from a requester device, to generate a first cloud to support a particular type of a virtual machine associated with an application platform to execute one or more applications of the virtual machine, wherein the request comprises one or more operating characteristics of the virtual machine and a time duration for which the first cloud is requested;
responsive to receiving the request, identify a set of resources associated with of a pool of available resources in view of the operating characteristics of the virtual machine, wherein the identified set of resources comprise at least one non-dedicated cloud controlled resources and at least one externally controlled resource, and wherein the identified set of resources comprises an operating system to support the operating characteristics of the virtual machine on the application platform;
generate the first cloud from the identified set of resources;
instantiate the virtual machine onto the application platform in the first cloud;
provide the requester device with access to the virtual machine; and
responsive to detecting an expiration of the time duration associated with the request, de-allocate the identified set of resources associated with the first cloud.

6. The system of claim 5, the processor further to maintain a record of the identified set of resources.

7. The system of claim 5, wherein the request to generate the cloud comprises a set of specification and the processor is to identify a portion of the identified set of resources that satisfy the set of specification.

8. The system of claim 5, wherein, to de-allocate the identified set of resources, the processor is to at least one of request de-allocation of the identified set of resources or directly de-allocate the identified set of resources.

9. The system of claim 5, wherein the request is received via a network interface.

10. A non-transitory computer readable medium having instructions encoded thereon which, when executed by a processor, cause the processor to:
receive a request, from a requester device, to generate a first cloud to support a particular type of a virtual machine associated with an application platform to execute one or more applications of the virtual machine, wherein the request comprises one or more operating characteristics of the virtual machine and a time duration for which the first cloud is requested;
responsive to receiving the request, identify a set of resources associated with a pool of available resources in view of the operating characteristics of the virtual machine, wherein the identified set of resources comprise at least one non-dedicated cloud controlled resources and at least one externally controlled resource, and wherein the identified set of resources comprises an operating system to support the operating characteristics of the virtual machine on the application platform;
generate, by the processor, the first cloud from the identified set of resources;
instantiate the virtual machine onto the application platform in the first cloud;
provide the requester device with access to the virtual machine; and
responsive to detecting an expiration of the time duration associated with the request, de-allocate the identified set of resources associated with the first cloud.

11. The non-transitory computer readable medium of claim 10, wherein the processor is further to maintain a record of the identified set of resources.

12. The non-transitory computer readable medium of claim 10, wherein the request to generate the cloud comprises a set of specification and the processor is to identify a portion of the identified set of resources that satisfy the set of specification.

13. The non-transitory computer readable medium of claim 10, wherein, to de-allocate the identified set of resources, the processor is to at least one of request de-allocation of the identified set of resources or directly de-allocate the identified set of resources.

* * * * *